Sept. 19, 1967  J. V. OLIVEAU  3,341,871
FLOTATION GEAR FOR THE RECOVERY OF A SUBMERGED CRAFT
Filed Oct. 4, 1965  3 Sheets-Sheet 1
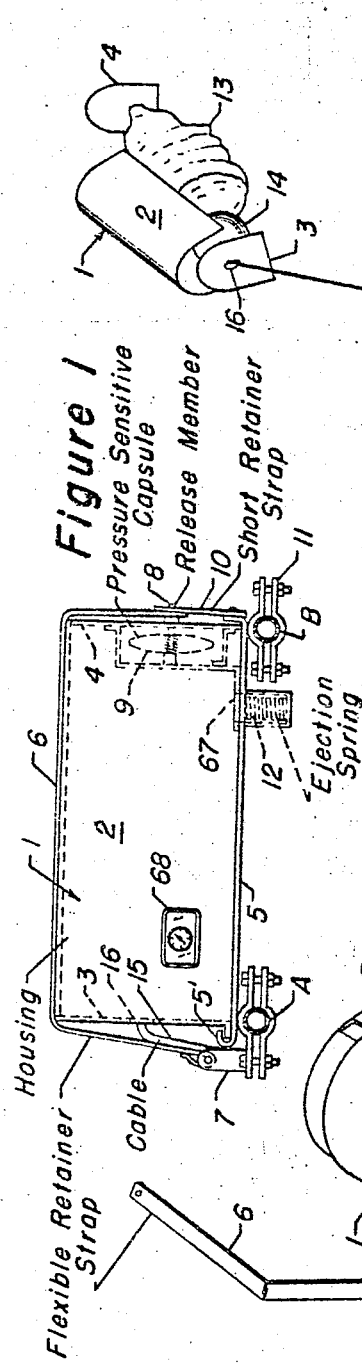
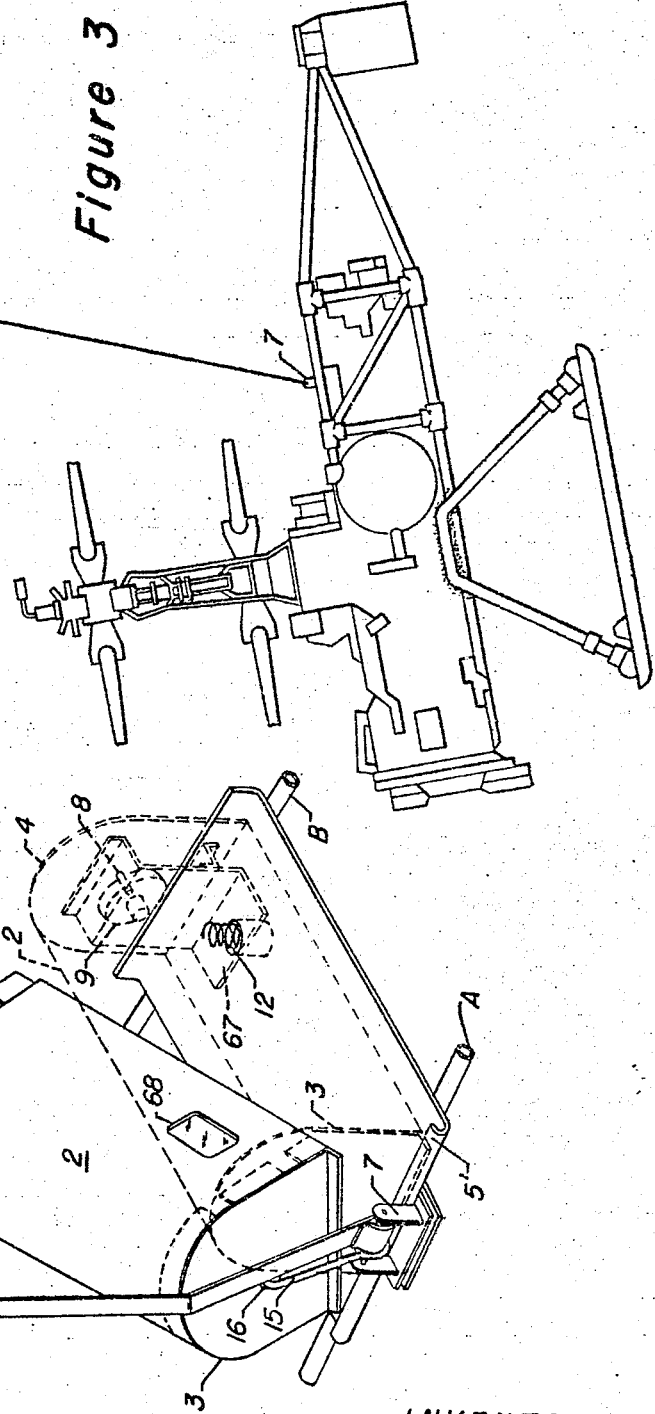
INVENTOR:
John V. Oliveau

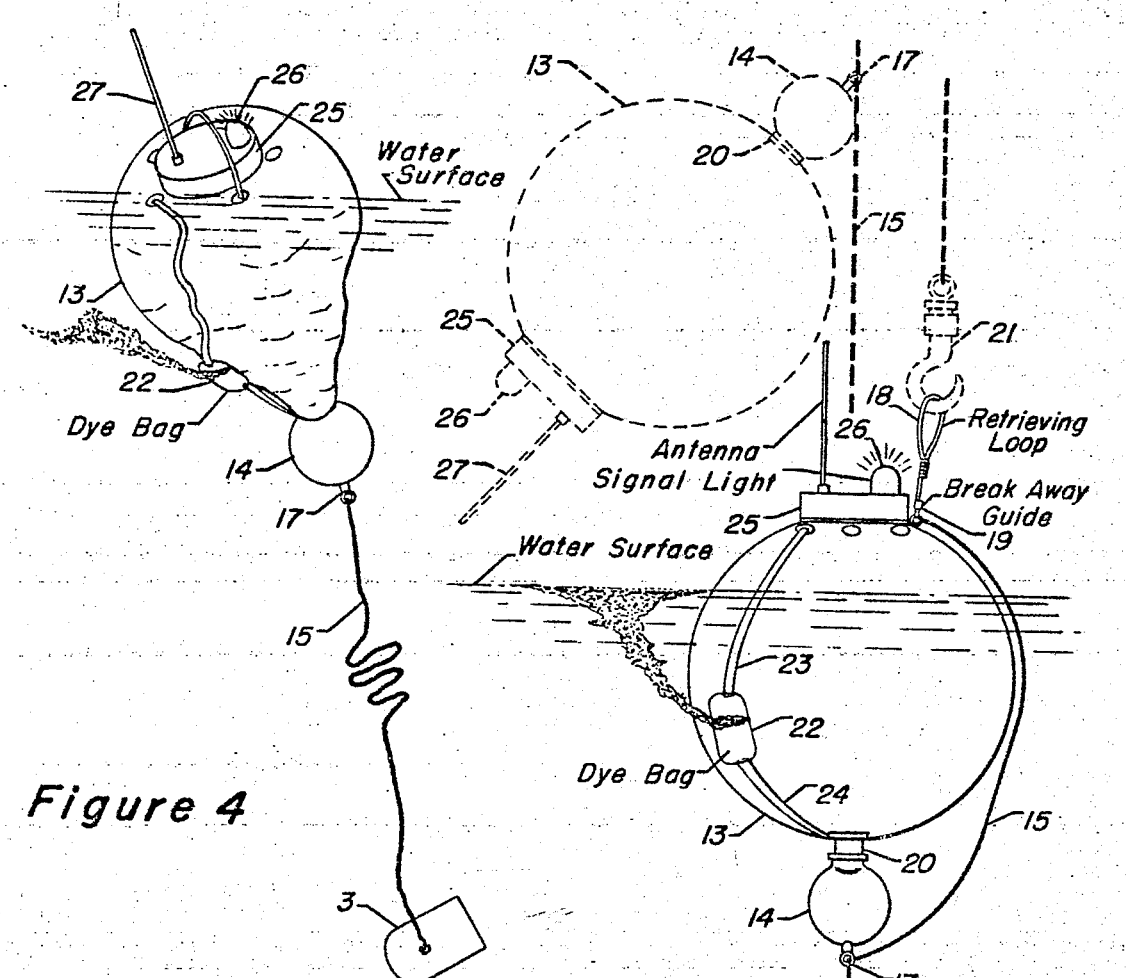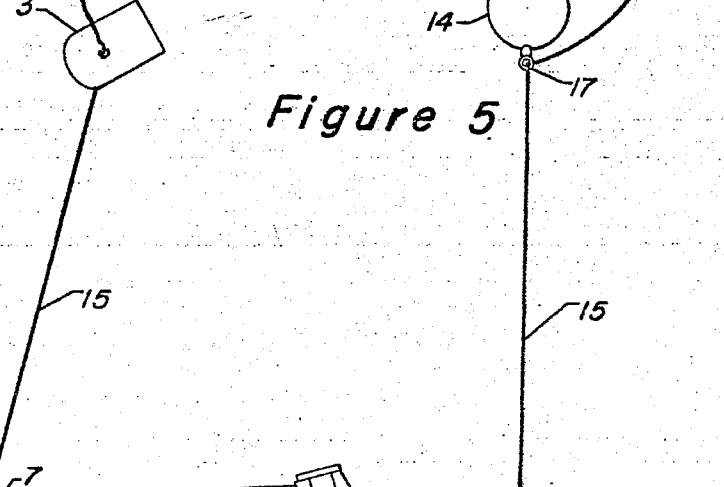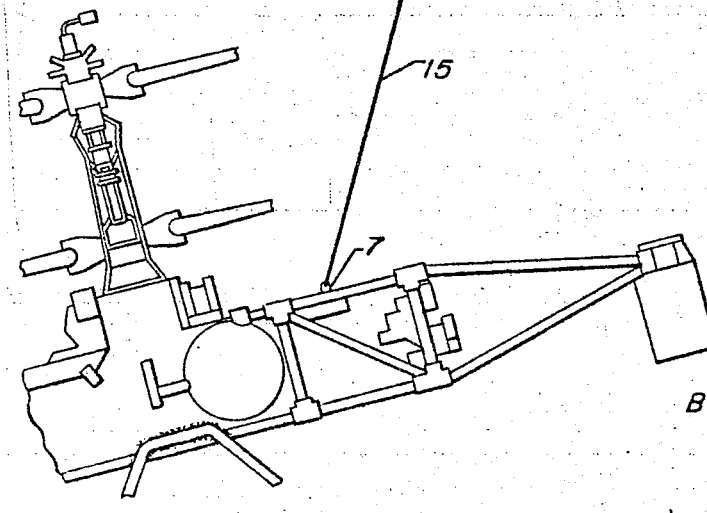

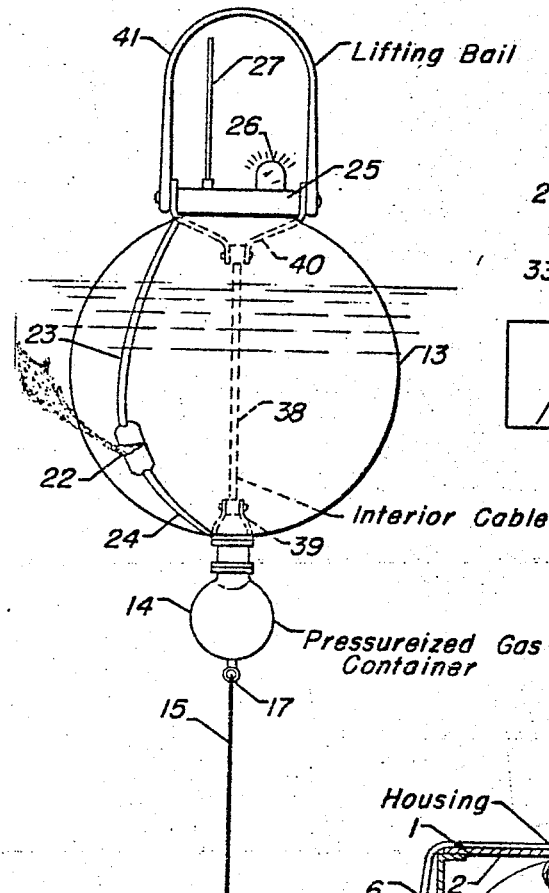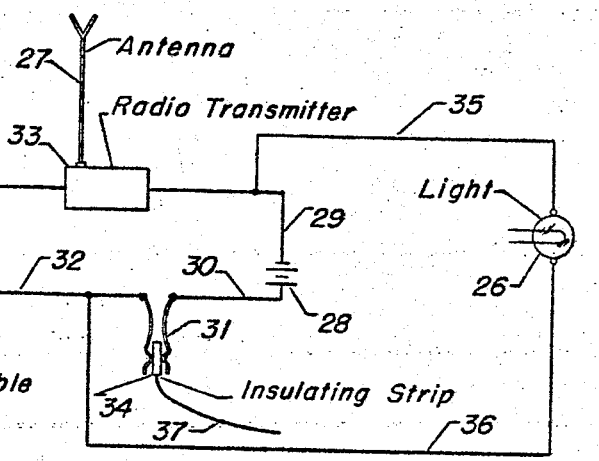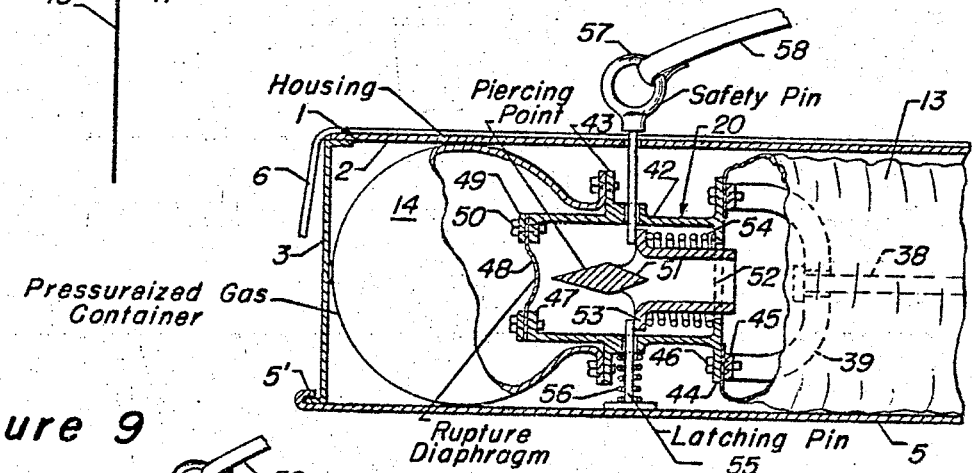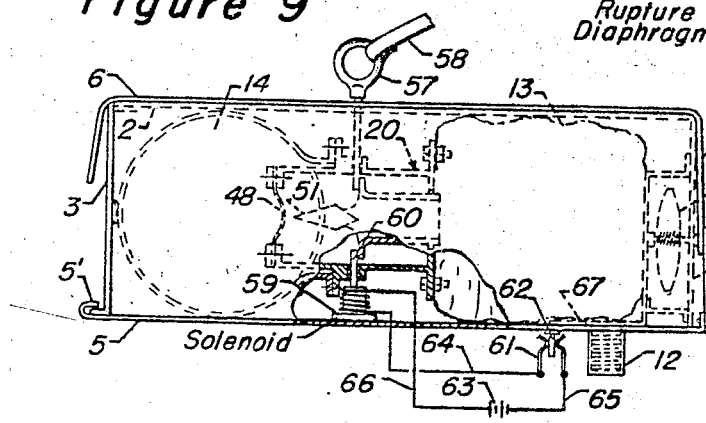

3,341,871
Patented Sept. 19, 1967

3,341,871
FLOTATION GEAR FOR THE RECOVERY OF A SUBMERGED CRAFT
John V. Oliveau, Greenwich, Conn., assignor to Universal Oil Products Company, Des Plaines, Ill., a corporation of Delaware
Filed Oct. 4, 1965, Ser. No. 492,393
13 Claims. (Cl. 9—9)

ABSTRACT OF THE DISCLOSURE

Flotation kit enabling recovery of pilotless aircraft downed at sea. An inflatable float bag, coupled through a gas release mechanism to a high pressure gas container, is packed within a disintegratable housing mounted on the aircraft. A pressure sensitive diaphragm triggers underwater disassembly of the housing, assisted by an ejection spring and the expanding float bag. The gas release mechanism contains a rupture disc pierceable by a spring-loaded knife released responsive to incipient disassembly of the housing. The float bag ascends to the ocean surface, supporting the submerged aircraft by a cable connecting therebetween. The kit may include a radio transmitter, signal light and dye marker.

---

The present invention relates to apparatus useful for holding and marking a craft that has become submerged in a body of water. More specifically, there is provided a novel flotation kit which can be retained within a disintegrating form of housing that can be attached to a craft so that such craft can be recovered and not lost by sinking in the body of water.

Actually, the apparatus of this invention may be of use on any small boat or flying craft, however, it has been particularly developed to be used on unmanned helicopters or "drones." Drone helicopters that are controlled by radio are of use as torpedo carriers in effecting the destroying of submarines. Frequently there may be a loss of contact with a drone and after it has exhausted its fuel supply it will drop into the sea. Since the value of each drone helicopter is very high, it is of prime importance to provide means for keeping them afloat.

It is thus a principal object of the present invention to provide means for the flotation of a helicopter which falls into a body of water and means for assisting in the recovery of such helicopter, although the flotation gear may well be used to hold and mark other types of aircraft or water surface craft.

Briefly, the present invention provides a flotation type of recovery kit for marking and holding a craft that has submerged into the sea, which comprises in combination, a disintegrating form of housing for storage of the recovery kit and adapted for removable mounting on the structure of the craft to be recovered, a pressure sensitive member connecting with movable release latch means that in turn holds said housing to said craft, said pressure sensitive member operative responsive to a predetermined hydraulic pressure acting thereon when the craft with said housing becomes submerged to a predetermined depth, an inflatable form of float with a connecting high pressure gas container sized and adapted for storage within said housing and connected by cable means to said craft, gas release means positioned between said inflatable float and said gas container for filling the float upon its release and unfolding from said housing, whereby to hold said craft from further submergence, and a retrieving loop being supported from above the inflated top portion of said float which is connective with said cable means to said craft whereby the latter may be lifted from its submerged position.

There are many problems associated with the rapid holding and floating of a craft which has fallen into a body of water. The time for inflation of a float means is, of course, quite critical since the inflation must be accomplished quickly after the craft falls below the surface of the water and before the pressure due to the depth becomes so great as to interfere with the operation of the system. The deeper a craft sinks beneath the surface of the water, the greater is the pressure and the less displacement there would be effected by the flotation bag. Thus, preferably, the unit provides for inflation to commence at just a few feet below the water surface and inflation to be completed before there is submergence to more than about 20 feet. In the present kit, there is the use of a pressure sensitive latch means to provide for the initial disintegration of the kit housing and for the triggering of the inflation of the holding float bag. Various schemes for effecting inflation may be utilized. However, one preferred form embodies the connection of a high pressure gas container to a foldable, inflatable float bag, along with integrated piercing means between the two. Special mechanical and/or electrical triggering means is used to provide that pressurized gas is transferred from the gas container to the float bag as they are released from their packed positions in the housing.

Various features of the present improved recovery kit and the advantages thereof may be better understood by referring to the accompanying drawings and to the following explanatory matter.

FIGURE 1 of the drawing is a diagrammatic elevational view of the recovery kit housing and retaining means suitable for mounting it to the super-structure of a helicoper or other craft.

FIGURE 2 of the drawing indicates, in a partial phantom view, the release of a retainer strap from the top of the disintegrating housing section of the unit.

FIGURE 3 shows diagrammatically the released, disintegrating housing and the commencement of the inflation of the float bag which has been packed within the housing.

FIGURE 4 shows diagrammatically a further inflation of the float at the water surface, whereby the submerged helicopter may be held at a predetermined depth below the surface of the water.

FIGURE 5 of the drawing shows diagrammatically the inflated craft supporting float at the water surface, together with attached radio and signal light means, and a dye that may be released to float on the water surface. In addition, there is shown a retrieving loop and cable support means which will permit recovery of the submerged helicopter by means of a hook which can be dropped from a rescue helicopter or ship.

FIGURE 6 shows diagrammatically an alternate form of lifting bail and lifting cable arrangement.

FIGURE 7 of the drawing indicates, in a simplified type of diagram, the means for activating the operation of a radio transmitter and a signal light which may be mounted to the top of the inflated float bag.

FIGURE 8 of the drawing indicates one form of diaphragm piercing means and triggering arrangement between the high pressure gas container and the inflatable float for the recovery kit.

FIGURE 9 of the drawing shows an alternative electrically operated release pin for the piercing means between the pressure container and the float bag.

Referring now particularly to FIGURES 1 and 2 of the drawing, there is shown a disintegrating form of container or housing 1 which has a top cover 2, end plates 3 and 4, and a bottom plate 5. The upper cover 2 of the container is held onto the bottom support plate 5 by a suitable retainer strap 6 which in turn extends between a mounting bracket 7 and a release latch pin 8 that is in turn connective with a pressure sensitive capsule 9 shown mounted on the interior face of end plate 4. A short retainer strap 10 also extends from release pin 8 to a mounting bracket 11. The brackets 7 and 11 are indicated diagrammatically as being attached to strut numbers A and B of the helicopter or other type of craft to which the recovery kit may be attached. The pressure sensitive release unit may embody varying designs but, in accordance with the present invention, there is utilized at least one pressure sensitive diaphragm or capsule which operates responsive to a low absolute pressure or hydrostatic pressure exerted by a water depth of but two or three feet such that the retainer strap 6 will be rapidly released to in turn release the cover 2 and permit disintegration of the entire housing. The release capsule may be of a conventional evacuated type with an internal spring which will hold the diaphragms separated for normal atmospheric pressure, but shall be calibrated to be quite sensitive so that the pressure of only about two to three feet of water pressure will trigger the compression of capsule 9 and the release of latch pin 8 which holds the end of the retainer strap 6.

As best shown in FIGURES 2 and 3, immediately after the release of the strap 6, by the pressure sensitive capsule 9 and release pin 8, there is action from an ejection spring 12 housed below the lower plate 5 and connective with a projecting lip or flange 67 from the housing 1 whereby the latter is caused to be rapidly pushed outwardly and immediately effect the release of the internal contents of the recovery kit. The internal contents shall consist primarily of a flexible and inflatable float bag 13 that is directly connective with a high pressure gas container 14, a lifting cable 15, as well as various signaling means. The joints between the parts of the housing or container 1 may be made in various ways, but in all instances shall be merely interlocking arrangements adapted to hold the container as a confined housing under the action of the retainer strap 6 Thus, when the strap 6 permits the ejection of housing cover 2 there will be a ready unlocking of joints between the cover 2, bottom 5 and end members 3 and 4, as illustrated in FIGURE 3. Also, preferably the spring means 12 is at one end and an interlocking flange means 5' at an opposing end such that the cover 2 will pivot open with the release of strap 6.

A cable 15, which is retained as a part of the kit, is permanently attached to the structure of the helicopter at mounting 7 and, as shown in FIGURES 2 and 3 of the drawing, such cable extends through a suitable small opening 16 in the end cover plate 3 to connect with the gas container 14. FIGURES 4 and 5 shows the extended cable connecting to a fastening or attachment means 17 on a lower portion of the pressure cylinder 14. Also, in one embodiment, the cable 15 can extend from the fastener 17 to a retrieving loop 18, which in turn is held in a substantial vertical positioning at the top of the inflated float bag 13 by break-away guide means 19.

As noted hereinbefore and as will be explained more fully hereinafter, the triggering of the inflation of float bag 13 is accomplished at the time of the ejection of the container 1 by the piercing of closure means placed between the high pressure gas compressor 14 and the bag 13 so that almost immediately after the housing has been submerged beneath the surface of the water there is a release of the container and the commencement of inflation of the folded flexible float bag 13. Preferably, the high pressure cylinder or container 14 is fixedly attached to the float bag 13 by an automatically operating gas release unit 20 which will provide a strong leakproof attachment between the two. The float bag itself shall be made of a gas-tight, reinforced fabric or elastomer such as of reinforced vulcanized rubber. The bag shall generally be made of a spheroidal shape so as to provide a maximum amount of water displacement around its lower peripheral zone, as well as provide the most efficient use of the bag with respect to material weight and material strength.

It is a particular feature of the present invention to insure having a substantially vertical positioning for a retrieving loop such as 18 in FIGURE 5 at a point above the surface of the water on the float whereby a lifting hook, such as shown in dashed lines as 21, from a rescue helicopter or other craft, not shown, can readily make engagement with the cable 15 for the lifting of the submerged helicopter. In the embodiment of FIGURE 5, a break-away guide loop or tie means 19 is used at the top end of the float 13 to merely temporarily hold the cable 15 in proper positioning. In other words, as weight is exerted on the upper portion of cable 15 by a lifting hook pulling upwardly on the loop 18, there will be a breaking of temporary guide means 19 and the cable 15 will, of course, become taut and substantially vertical under the load to provide the positioning, as shown in the dashed lines of FIGURE 5, where the pressure cylinder 14 and the float bag 13 are off to one side of the lifting cable 15.

In alternative construction, as shown in FIGURE 6, there is used an interior cable 38 on the inside of float bag 13. Such cable will extend between an internal top portion 39 of the gas release connector section 20 and an internal lower portion 40 of a lifting bail 41 on the top of the float 13. The bail 41 is constructed to extend around the radio unit 25 and the signal light 26 and, in addition, to maintain a vertical position when the float bag 13 is inflated. The straight through interior cable 38 and the rigid lifting bail arrangement 41 is of some advantage over the embodiment of FIGURE 5 by insuring a good vertical positioning of the bail for recovery lifting purposes.

Also, a preferred embodiment of the recovery kit, as is shown in FIGURES 4, 5, and 6, shall include suitable signaling means to assist in finding and recovering a submerged craft. A dye supply is released to the surface of the water by using a breakable dye bag 22 which in turn is attached to the ends of the float bag 13 by tie members 23 and 24. The latter can be sized such that as the float bag becomes fully inflated they will pull and tear open the dye containing bag 22 to release its contents for flotation on the water surface. A floating dye will of course assist air reconnaissance in spotting a submerged craft.

Within a small housing 25 attached to the top end of the float 13 there is provision for a battery and a radio for transmitting radio signals of a predetermined type as well as electrical energy for a signal light 26 that is mounted on the exterior of the housing. An antenna 27 is also indicated as extending above the radio-battery housing 25. As best shown diagrammatically in FIGURE 7 of the drawing, there is provided one embodiment of electrical circuiting for the radio and signal light. A battery 28 connects through lines 29 and 30, a switch 31, and line 32 to a radio transmitter indicated as 33 when a switch 31 is permitted to close. During the storage of the kit in the container 1, there is a suitable non-conductive insulator strip 34 mounted across the switch 31 so that there is no energizing of the radio 33 nor of the light 26 which connects to the battery through lines 35 and 36. However, pull cord means may be provided, such as by a small cord 37, to connect between a portion of the bag and the insulator strip 34 such that the cord will be pulled out of the switch 31 as there is an increased inflation of bag 13. Other suitable switching means, of course, may be provided to effect an energizing of the circuit from the battery 28 upon the completion of the inflation of float bag 13, so as to operate the signal light 26 and the radio transmitter 33 in the housing 25 above the water surface and it is not intended to limit the present invention to any one particular means for energizing the signal equipment used in combination with the craft holding and lifting kit.

Referring now to FIGURE 8 of the drawing, there is shown diagrammatically one form of gas release section 20 for use between the high pressure gas container 14 and the inflatable float bag 13. In this instance a structurally strong cylindrically shaped body section 42, with flanges 43 and 44, connects between the flanged top portion of container 14 and the lower end of float material 13. The latter may, for example, be attached to flange 44 by sealing it and clamping it to an inner ring member 45 by suitable bolt means 46. The ring member 45 may in turn be used to hold an internal cable, such as cable 38 in the embodiment of FIGURE 6. The portion of the body section 42 which extends into the container 14 is shown as having a flange 47 to hold a rupture disc or diaphragm 48, the latter being clamped in a pressure tight manner to the flange 47 by a clamp ring 49 and bolts 50. The rupture disc of course precludes the passage of the compressed gas of container 14 from passing into the folded float bag 13 until such time as the unit and kit is released from the housing 1.

The present embodiment is entirely mechanical, from compression spring means, in effecting the piercing of the disc 48 and releasing gas upon the disintegration of housing 1. A piercing knife or point 51 is held internally adjacent the diaphragm 48 from the end of a movable hollow core member 52. The latter has a flange or shoulder 53 such that a heavy compression spring 54 may be held in the annular space interiorly of body section 42 and within an interior end portion of the flange 44. The spring 54 is held in compression by a latching pin 55 which in turn extends through the wall of the body section 42 to engage or rest under the flange 53 on the core member 52. A compression spring 56 is also used around latching pin 55 such that it will be rapidly pulled out of the body section when there is a lifting of the cover section 2 from the lower plate 5 of the housing unit. It will be seen that the removal of the pin 55 permits the core member 52 with knife point 51 to be thrown against disc 48 and in turn permit gas to flow from the container 14, through the interior of member 52 into the float bag 13.

The compressed gas used in the container 14 may comprise compressed air, nitrogen, or other non-flammable material, and it is not intended to limit the present invention to any one gaseous material for the inflation of float bag 13. As a safety feature for handling the uninflated kit, there is provided a safety pin 57, with a marking streamer 58, to hold the knife edge from springing against the rupture disc during the handling and installing of the recovery gear and housing 1 onto the helicopter or other craft. After the housing 1 with the encompassed gear is all in place on the craft ready for normal operation, then the safety pin 57 can be pulled from the body section 42 and from below the shoulder 53 on the core member 52. The safety pin is, of course, not pulled until the latching pin 55 is firmly in place.

Referring now to FIGURE 9 of the drawing, there is indicated a modified gas release arrangement which utilizes an electrical solenoid 59 to retract a latching pin member 60. The latter can be utilized to hold on internal core member and accompanying knife like point against the action of a compression spring in a manner similar to that shown and described for the pin 55 for releasure unit 20 of FIGURE 8. In other words, the electrically operated solenoid 59 is used in lieu of the spring means 56 for pin 55 of the first described embodiment. Again referring to the alternative embodiment of FIGURE 9, there is diagrammatically shown a spring switch means 61 having an insulator member 62 placed therein to keep an open circuit, a power source from battery 63, and wires 64, 65, and 66 providing means for energizing the solenoid 59. In actual operation, when the pressure sensitive capsule 9 releases strap 6 and cover 2 for the housing 1, there will be ejection of end plate 4 along with cover 2 and the projecting housing flange 67 by means of the compression spring 12. With insulator member 62 connecting to flange means 67, there will then result an immediate closing of switch 61 and energizing of solenoid 59 as the disintegration of housing 1 is initiated. The retraction of pin end 60 of solenoid 59 in turn unleashes the action of the piercing member of the gas release means 20 so that an almost simultaneous flow of pressurized gas takes place into float bag 13.

It will be seen that the present recovery kit has the capability of providing rapid inflation so as to preclude a sinking helicopter, small ship, "one-man" submarine, or other craft, from descending below a pre-determined distance effected by cable 15 which is fixedly attached between the eventual lower end of the high pressure cylinder 14 at 17 and the mounting member 7. Further, the mechanism triggering the action of the recovery kit is sensitive to pressure but not to temperature and can be utilized within a wide range of temperature conditions from below zero through high temperatures depending, of course, upon the proper selection of the liquified gas being utilized in the pressure cylinder 14. The pressure sensitive release means for the housing 1 in turn triggers, in the present invention, the release of gas into the float bag so that there is substantially no time lost in initiating the inflation of the bag and prior to the time the craft can submerge to any great depth. Actually, as the float bag inflates, it buoys up toward the surface of the water and its volume increases proportionately with the decrease in ambient water pressure. For inspection purposes, a suitable pressure gauge means may be built into the side of the gas container 14 to make sure that adequate pressure is being held therein. A suitable window means, such as 68, may be provided in the side of the cover 2 of housing 1 to in turn line up with the normal positioning of the gauge in container 14 when the latter is stored in the kit.

I claim as my invention:

1. A flotation type recovery kit for marking and holding a craft that has submerged into the sea, which comprises in combination:
    (1) a disintegrating form of housing for storage of the recovery kit adapted for removable mounting on the structure of the craft to be recovered;
    (2) movable release latch means holding said housing to said craft;
    (3) a pressure sensitive member connecting with said release latch means operative responsive to a predetermined hydraulic pressure acting thereon when the craft with said housing becomes submerged to a predetermined depth;
    (4) a float assembly including an inflatable form of float with an attached high pressure gas container sized and adapted for storage within said housing;
    (5) cable means connecting said float assembly to said craft;
    (6) gas release means positioned between said inflatable float and said gas container for filling the float upon its release and unfolding from said housing, whereby to hold said craft from further submergence, said gas release means comprising:
        (a) a body section extending between and connecting said gas container with said inflatable float;
        (b) a rupture disc mounted across said body section;
        (c) a movable spring-loaded piercing member mounted within said body section in a position permitting such member to be urged against and pierce said rupture disc;
        (d) a movable latch pin having at least a portion extending within said body section and into engagement with a portion of said piercing member to hold it against compressed spring means in turn engaging the latter; and
        (e) pin moving means connective with said latch pin providing for the movement thereof to release said piercing member when said float assembly is in turn released from said housing.

2. The recovery kit of claim 1 further characterized in that a retrieving loop means is positioned from the inflated top portion of said float which is connective with said cable means to said craft whereby the latter may be lifted from its submerged position.

3. The recovery kit of claim 2 further characterized in that said cable means is connected from said craft to said gas container and cable means is then extended from said last-named point of connection exteriorly around the inflated float to connect with said retrieving loop means, the latter being held in a substantially vertical position by breakaway guide means.

4. The recovery kit of claim 2 further characterized in that said cable means is connected from said craft to said gas container and said retrieving loop means is connected to the body section of said gas release means by a cable extending interiorly through the inflated float.

5. The recovery kit of claim 4 further characterized in that said retrieving loop means is a rigid lifting bail member.

6. The recovery kit of claim 1 further characterized in that a signaling means is carried by said inflatable float for aid in locating the latter when it is inflated and holding the submerged craft.

7. The recovery kit of claim 6 further characterized in that said signaling means comprises at least a radio wave transmitter unit as part of a battery energized circuit, with the latter having a switch means operative to close said circuit responsive to the release of the float from said housing and to the substantial inflation of said float.

8. The recovery kit of claim 6 further characterized in that said signaling means comprises at least a signal light means as a part of a battery energized circuit, with the latter having a switch means operative to close said circuit responsive to the release of the float from said housing and to the substantial inflation of said float.

9. The recovery kit of claim 1 still further characterized in that said pin moving means for said latching pin comprises a compression spring mounted between said body section and said disintegrating housing whereby to pull said pin from engagement with said piercing member.

10. The recovery kit of claim 1 still further characterized in that said pin moving means for said latching pin comprises an electric solenoid connective with the latter to effect the disengagement with said piercing member, and said solenoid is part of a battery energized circuit having a switch therein operative to close the circuit responsive to a releasing of said gas container and said float from said housing.

11. The recovery kit of claim 1 further characterized in that a pressure sensitive diaphragm is used as said pressure sensitive member and such diaphragm connects with a movable pin means in turn engaging strap means encompassing at least a portion of said disintegrating housing, whereby the latter may release its stored contents responsive to a predetermined slight pressure on said diaphragm.

12. A flotation type recovery kit for marking and holding a craft that has submerged into the sea, which comprises in combination:
(1) a disintegrating form of housing for storage of the recovery kit adapted for removable mounting on the structure of the craft to be recovered, said housing including a top cover section and a bottom closure member removably and pivotally engaged therewith to permit, responsive to an unrestrained internal separating force, an initial limited rotation of said top section relative to said bottom closure member about a pivotal axis and subsequent separation of the top section from the bottom closure member;
(2) flexible retainer strap means encompassing and in contact with at least a portion of said disintegrating housing, maintaining said housing as a normally unified structure and securing the housing to said craft;
(3) ejection spring means, connective between said bottom closure member and said top cover section, laterally spaced from said pivotal axis;
(4) strap release means operatively associated with said strap means for rapidly releasing the latter;
(5) a pressure sensitive member connecting with said strap release means operative responsive to a predetermined hydraulic pressure acting thereon when the craft with said housing becomes submerged to a predetermined depth;
(6) a float assembly including an inflatable form of float with an attached high pressure gas container sized and adapted for storage within said housing;
(7) cable means connecting said float assembly to said craft; and
(8) gas release means positioned between and connecting said inflatable float to said gas container for filling the float upon its release and unfolding from said housing, whereby to hold said craft from further submergence.

13. The recovery kit of claim 12 further characterized in that said top cover section comprises a top cover removably interlocked with at least one end closure member, said bottom closure member being removably and pivotally engaged with said end closure member.

References Cited

UNITED STATES PATENTS

| | | | |
|---|---|---|---|
| 2,470,783 | 5/1949 | Mead | 9—9 |
| 2,559,918 | 7/1951 | Grieb | 9—9 |
| 2,752,615 | 7/1956 | Parker | 9—9 |
| 2,853,724 | 9/1958 | Smith | 9—9 |

MILTON BUCHLER, *Primary Examiner.*

T. MAJOR, *Assistant Examiner.*